United States Patent
Wang et al.

(10) Patent No.: US 11,960,039 B2
(45) Date of Patent: Apr. 16, 2024

(54) X RAY DEVICE AND MANUFACTURING METHOD THEREOF

(71) Applicant: InnoCare Optoelectronics Corporation, Tainan (TW)

(72) Inventors: Chih-Ying Wang, Tainan (TW); Chih-Hao Wu, Tainan (TW)

(73) Assignee: InnoCare Optoelectronics Corporation, Tainan (TW)

( * ) Notice: Subject to any disclaimer, the term of this patent is extended or adjusted under 35 U.S.C. 154(b) by 0 days.

(21) Appl. No.: 18/308,688

(22) Filed: Apr. 28, 2023

(65) Prior Publication Data

US 2023/0266486 A1    Aug. 24, 2023

Related U.S. Application Data

(63) Continuation of application No. 17/356,523, filed on Jun. 24, 2021, now Pat. No. 11,681,056.

(30) Foreign Application Priority Data

Jul. 17, 2020   (CN) .......................... 202010691039.8

(51) Int. Cl.
*G01T 1/20*   (2006.01)

(52) U.S. Cl.
CPC .................................. *G01T 1/2018* (2013.01)

(58) Field of Classification Search
None
See application file for complete search history.

*Primary Examiner* — Edwin C Gunberg
(74) *Attorney, Agent, or Firm* — JCIPRNET

(57) ABSTRACT

An X ray device, including an array substrate, a scintillator layer, a first adhesion layer, a function film, and a second adhesion layer, is provided. The scintillator layer is disposed on the array substrate. The first adhesion layer is disposed between the scintillator layer and the array substrate. The function film is disposed on the array substrate. The second adhesion layer is disposed between the function film and the array substrate. The function film covers the scintillator layer.

12 Claims, 5 Drawing Sheets

X RAY DEVICE AND MANUFACTURING METHOD THEREOF

CROSS-REFERENCE TO RELATED APPLICATION

This application is a continuation application of and claims the priority benefit of U.S. application Ser. No. 17/356,523, filed on Jun. 24, 2021, which claims the priority benefit of China application serial no. 202010691039.8, filed on Jul. 17, 2020. The entirety of each of the above-mentioned patent applications is hereby incorporated by reference herein and made a part of this specification.

BACKGROUND OF THE INVENTION

1. Field of the Invention

The disclosure relates to an electronic device and a manufacturing method thereof, and more particularly to an X ray device and a manufacturing method thereof.

2. Description of Related Art

A scintillator layer in an X ray device is easy to crack through being affected with damp. Therefore, it is very important to reduce an invasion probability of external moisture into the scintillator layer.

SUMMARY OF THE INVENTION

The disclosure provides an X ray device and a manufacturing method thereof, capable of effectively reducing an invasion probability of external moisture into a scintillator layer.

According to embodiments of the disclosure, the X ray device includes an array substrate, a scintillator layer, a first adhesion layer, a function film and a second adhesion layer. The scintillator layer is disposed on the array substrate. The first adhesion layer is disposed between the scintillator layer and the array substrate. The function film is disposed on the array substrate. The second adhesion layer is disposed between the function film and the array substrate. The function film covers the scintillator layer.

According to embodiments of the disclosure, the manufacturing method of the X ray device includes the following steps. The scintillator layer is attached onto the array substrate through the first adhesion layer. The function film is attached to the array substrate through the second adhesion layer. The function film covers the scintillator layer.

To make the features and advantages of the disclosure clear and easy to understand, the following gives a detailed description of embodiments with reference to accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
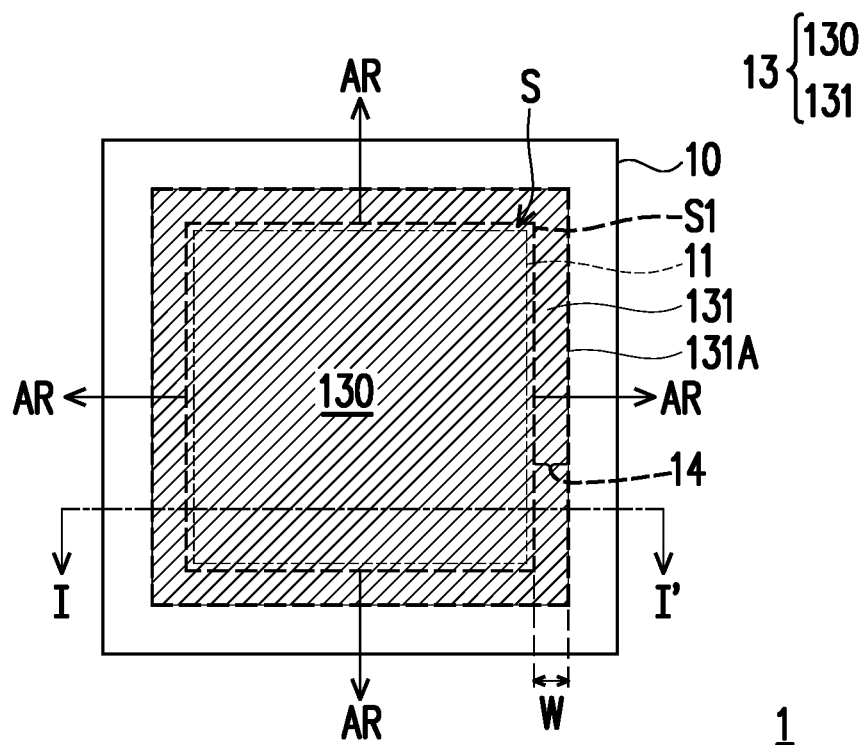
FIG. 1 is a schematic top view of an X ray device according to a first embodiment of the disclosure.

This disclosure may be understood with reference to the following detailed description and the accompanying drawings. It should be noted that, for ease of understanding by readers and concise drawings, a plurality of drawings in this disclosure merely show a part of an electronic device/a display device, and specific components in the drawings are not drawn to scale. In addition, the quantity and size of the components in the drawings are merely exemplary, and are not intended to limit the scope of this disclosure. For example, the relative sizes, thicknesses and positions of films, regions and/or structures may be reduced or enlarged for clarity.

Some words are used to refer to specific components in the whole specification and the appended claims in this disclosure. A person skilled in the art should understand that an electronic device manufacturer may use different names to refer to the same components. This specification is not intended to distinguish components that have the same functions but different names. In this specification and the claims, words such as "comprise" and "have" are open words, and should be interpreted as "including, but not limited to".

The directional terms mentioned herein, like "above", "below", "front", "back", "left", and "right", refer to the directions in the accompanying drawings. Therefore, the directional terms are only used for illustration instead of limiting this disclosure. Therefore, the directional terms are only used for illustration instead of limiting this disclosure. It should be understood that, when a component or a film is referred to as being disposed "on" another component or film or connected to another component or film, the component or the film may be directly disposed on the another component or film or directly connected to the another component or film, or there are components or films inserted between the two components or films (indirect case). Conversely, when a component or a film is referred to as being "directly" disposed "on" another component or film or "directly connected to" another component or film, there is no component or film inserted between the two structures or films.

As used herein, the terms "about", "equal to", "equal", "same", "substantially", or "generally" usually refer to within 10% of a given value or range or within 5%, 3%, 2%, 1%, or 0.5% of a given value or range. In addition, the terms "a given range is from a first value to a second value" and "a given range falls within the range of a first value to a second value indicate that the given range includes the first value, the second value, and other values between the first value and the second value.

In some embodiments of the disclosure, terms such as "connected", "interconnected", and the like with respect to joining, connecting, may refer to two structures being in direct contact unless specifically defined, or may refer to two structures not being in direct contact, and other structures are disposed between the two structures. The terms of joining and connection may also include a case that two structures may both move, or two structures are fixed. In addition, the terms of "electrical connection" and "coupling" include any direct and indirect electrical connection means.

In the following embodiments, same or similar reference numerals are used to indicate same or similar components, and details may be omitted in the description. In addition, the features in the embodiments may be used in any combination without departing from the spirit of the invention or conflicting with each other, and simple equivalent changes and modifications made to the specification or the claims shall still fall within the scope of the disclosure. In addition, the terms "first", "second", and the like mentioned in the specification or the claims are used only to name different components or to distinguish between different embodiments or ranges, but are not intended to define the upper or lower limit of the number of components or the manufacturing or arrangement order of the components.

Figure 2:
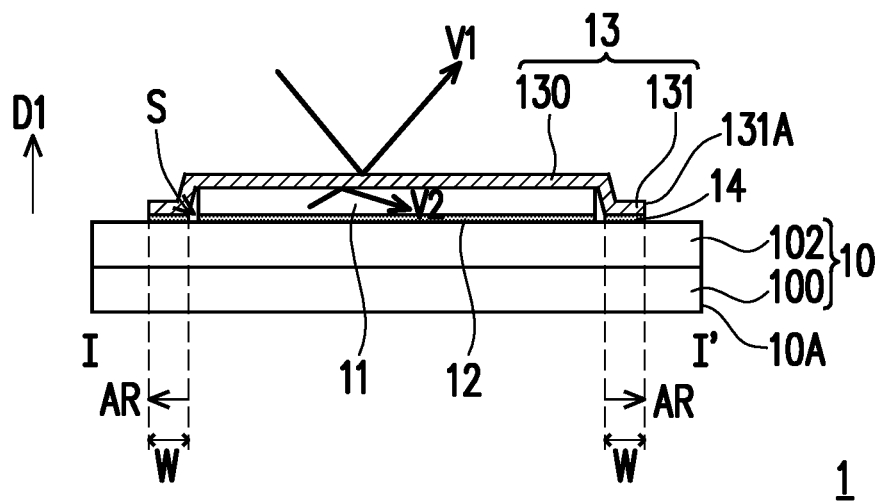
FIG. 2 is a schematic sectional view along a hatching line I-I' of FIG. 1.

FIG. 1 is a schematic top view of an X ray device according to a first embodiment of the disclosure. FIG. 2 is a schematic sectional view along a hatching line I-I' of FIG. 1. Referring to FIG. 1 and FIG. 2, an X ray device 1 may include an array substrate 10, a scintillator layer 11, a first adhesion layer 12, a function film 13 and a second adhesion layer 14.

As shown in FIG. 2, the array substrate 10 may include a substrate 100 and a sensing array 102. The substrate 100 is applicable to carrying the sensing array 102. According to different requirements, the substrate 100 may be a hard substrate, a soft substrate, a curved substrate, a flexible substrate or a substrate of any other forms. Additionally, the light transmittance of the substrate 100 is not limited. That is, the substrate 100 may be a transparent substrate, a semi-transparent substrate or a lighttight substrate. For example, a material of the substrate 100 may include glass, quartz, sapphire, plastics, ceramics, stainless steel, polyimide (PI), polycarbonate (PC), polyethylene terephthalate (PET) or a combination thereof, but the disclosure is not limited thereto.

The sensing array 102 is disposed on the substrate 100, and is located between the scintillator layer 11 and the substrate 100. The sensing array 102 may include a plurality of sensing units (not drawn) and a circuit (not drawn) connected with the sensing units. The sensing units are arranged into an array, so as to generate an image. Each of the sensing units may include one or more switch elements and one or more photosensitive elements connected with the one or more switch elements. The switch element, for example, may include a film transistor. The photosensitive element, for example, may include a photodiode. However, an arrangement mode of the sensing units, the quantity of the switch elements included by each of the sensing units, the quantity of the photosensitive elements included by each of the sensing units, a type of the switch elements or a type of the photosensitive elements may change according to requirements, and the disclosure is not limited thereto.

The scintillator layer 11 is disposed on the array substrate 10. For example, the scintillator layer 11 may be attached to the array substrate 10 through the first adhesion layer 12. That is, the first adhesion layer 12 is disposed between the scintillator layer 11 and the array substrate 10. A material of the first adhesion layer 12 may include optical clear adhesive (OCA) or optical clear resin (OCR), but the disclosure is not limited thereto.

The scintillator layer 11 is applicable to converting X rays emitted into the X ray device 1 into visible light. The sensing array 102 of the array substrate 10 is applicable to sensing the visible light and generating an image corresponding to light intensity distribution of the visible light.

Further referring to FIG. 1 and FIG. 2, the function film 13 is disposed on the array substrate 10 and covers the scintillator layer 11. For example, the function film 13 may be attached onto the array substrate 10 through the second adhesion layer 14. That is, the second adhesion layer 14 is disposed between the function film 13 and the array substrate 10. A material of the second adhesion layer 14 may include optical clear adhesive (OCA) or optical clear resin (OCR), but the disclosure is not limited thereto. The covering mentioned by the disclosure refers to that other layers may be included, or may not be included between the function film 13 and the scintillator layer 11.

According to different requirements, the function film 13 may be a single layer or a composite layer. For example, a material of the function film 13 may include a metal foil, plastics, metal, an organic material, an inorganic material or a combination thereof. The plastics may include PET, PEN and parylene, but the disclosure is not limited thereto.

In some embodiments, the function film 13 may include a reflecting layer (not drawn) and a waterproof layer (not drawn) sequentially stacked in a normal direction D1 of the array substrate 10, but the disclosure is not limited thereto. The reflecting layer is applicable to transmitting X rays and reflecting visible light. For example, as shown in FIG. 2, visible light V1 in external environment light is reflected by the reflecting layer, and interference caused by the visible light in the external environment light on a sensing result may be reduced. Additionally, through the reflecting layer, visible light (for example, visible light V2) transmitted towards outside is recovered. In detail, when being emitted onto the reflecting layer, the visible light V2 can be reflected by the reflecting layer, and can advance in a direction towards the sensing array 102. Therefore, the visible light generated by the scintillator layer 11 and captured by the sensing array 102 is favourably increased. The waterproof layer is applicable to preventing moisture from seeping into the scintillator layer 11, so as to reduce adverse influence of the moisture on the scintillator layer 11 and prolong a service life of the scintillator layer 11. In some embodiments, waterproof performance of the waterproof layer may be regulated, so as to meet requirements of different products. For example, a material, a thickness or a structure of each stack layer of the function film 13 may be regulated, or a material or the second adhesion layer 14 or an adhesion distance between the second adhesion layer and the array substrate 10 may be regulated, so as to meet requirements of different products.

As shown in FIG. 2, the function film 13, the second adhesion layer 14 and the array substrate 10 may form an airtight space S. Additionally, the first adhesion layer 12 and the scintillator layer 11 are located in the airtight space S. In some embodiments, the airtight space S may be in a vacuum state. For example, a film sealing manufacturing process may be performed in a vacuum environment or an environment with an atmospheric pressure similar to 0, but the disclosure is not limited thereto. In another embodiment, a pressure of the airtight space S is smaller than the external environment pressure or an atmospheric pressure (1 atm). In some embodiments, the function film 13 may include a top 130 and a bottom 131. Referring to FIG. 1, the bottom 131 of the function film 13 is a region from a boundary Si of the airtight space S to an outer edge 131A of the function film 13, and other portions are the top 130.

Through the function film 13 and the second adhesion layer 14, the scintillator layer 11 is sealed on the array substrate 10, so that an invasion probability of external moisture into the scintillator layer 11 may be effectively reduced. Referring to FIG. 1, in some embodiments, in a top view direction, for a width W, a maximum width of the bottom 131 in an extending direction AR may be measured for regulating the waterproof capability of the side. For example, the width W of the bottom 131 in the extending direction may be greater than or equal to 0.2 mm, so as to improve the waterproof capability of the side. In some embodiments, the width W may be greater than or equal to 2 mm, but the disclosure is not limited thereto. An upper limit value of the width W may be determined according to a size of the array substrate 10. In other embodiments, an outer edge (for example, an outer edge 131A) of the bottom 131 may be cut to be flush with an edge (for example, an edge 10A) of the array substrate 10.

Figure 3:
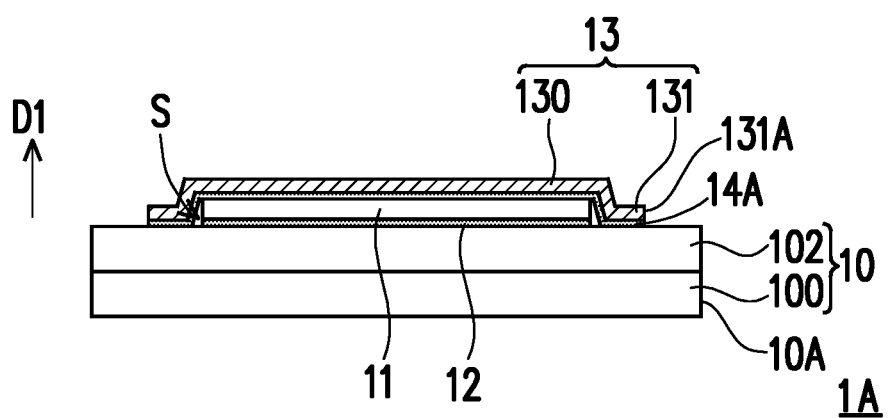
FIG. 3 is a schematic sectional view of an X ray device according to a second embodiment of the disclosure.

FIG. 3 is a schematic sectional view of an X ray device according to a second embodiment of the disclosure. Referring to FIG. 3, differences between an X ray device 1A and the X ray device 1 in FIG. 2 are mainly as follows. In the X ray device 1 in FIG. 2, through being observed from the top view (as shown in FIG. 1) of the X ray device 1, a shape of the second adhesion layer 14 is, for example, a frame shape. The second adhesion layer 14 is disposed between the bottom 131 and the array substrate 10. In the normal direction (such as a direction D1) of the substrate 100, the second adhesion layer 14 and the scintillator layer 11 are not overlapped. In the X ray device 1A in FIG. 3, a second adhesion layer 14A is at least partially overlapped with a top 130 and a bottom 131 in a direction D1. Through being observed from a top view (not drawn) of the X ray device 1A, a shape of a second adhesion layer 14A is, for example, in a quadrilateral shape. As shown in FIG. 3, besides being disposed between the bottom 131 and an array substrate 10, the second adhesion layer 14A may also be disposed between a function film 13 and a scintillator layer 11, so as to improve adhesion force between the function film 13 and the scintillator layer 11.

Figure 4:
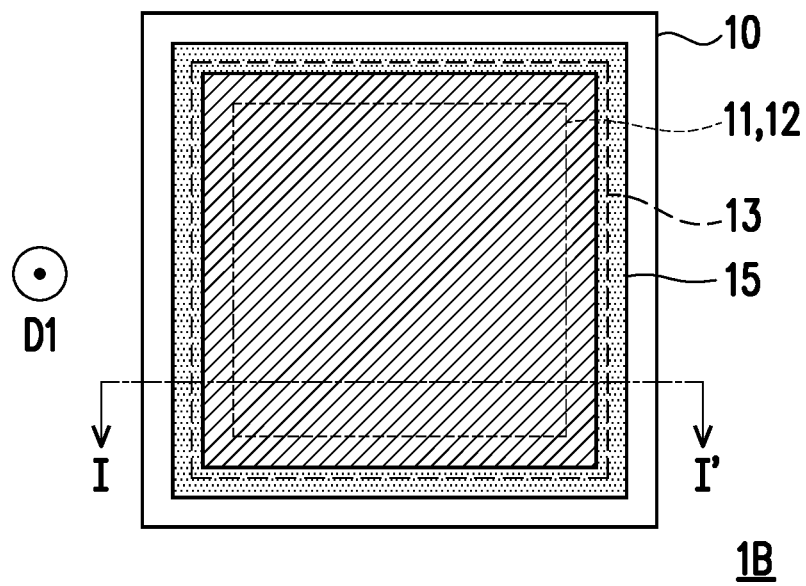
FIG. 4 and FIG. 5 are respectively a schematic top view and a schematic sectional view of an X ray device according to a third embodiment of the disclosure.
Figure 5:
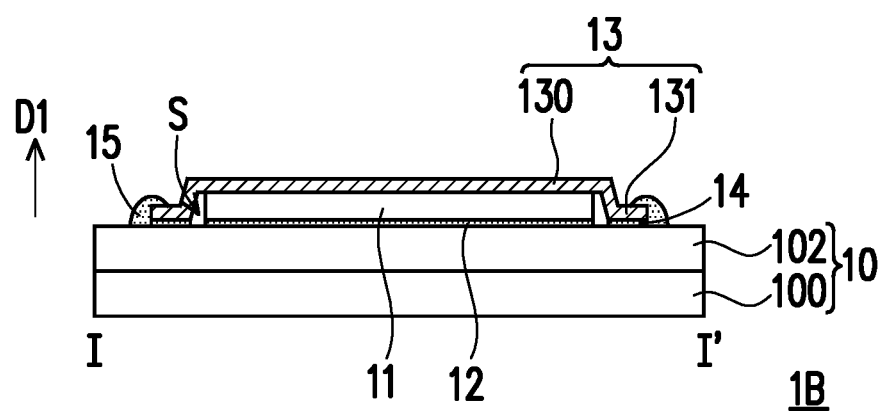

FIG. 4 and FIG. 5 are respectively a schematic top view and a schematic sectional view of an X ray device according to a third embodiment of the disclosure. For clarity, a second adhesion layer 14 is not drawn in FIG. 4. For relative arrangement relationships of the second adhesion layer 14 to other elements, reference may be made to FIG. 5.

Referring to FIG. 4 and FIG. 5, differences between an X ray device 1B and the X ray device 1 in FIG. 1 and FIG. 2 are mainly that the X ray device 1B further includes a sealing layer 15. The sealing layer 15 is disposed on a function film 13 and an array substrate 10, so as to further improve the waterproof capability of the side. In some embodiments, the sealing layer 15 is disposed on the array substrate 10. In a direction D1, the sealing layer 15 is at least partially overlapped with a bottom 131, but the disclosure is not limited thereto. In some embodiments, a material of the sealing layer 15 may include a UV release adhesive, a pyrogenic release adhesive or a cold release adhesive, but the disclosure is not limited thereto. In other embodiments, the second adhesion layer 14 in the X ray device 1B may be replaced into a second adhesion layer 14A in FIG. 3.

Figure 6:
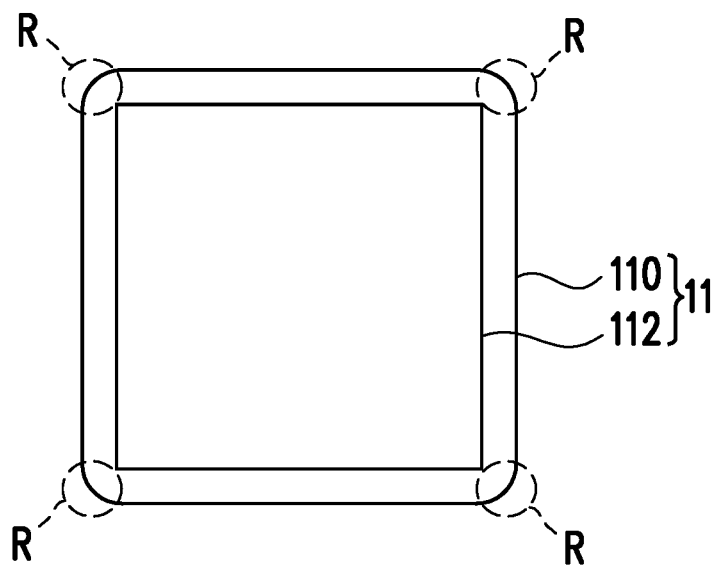
FIG. 6 and FIG. 7 are respectively schematic top views of scintillator layers according to a plurality of embodiments of the disclosure.
Figure 7:
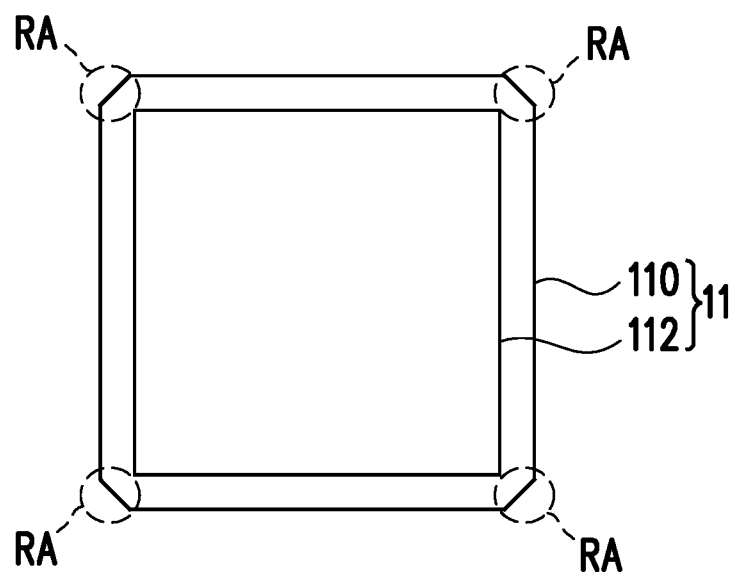

FIG. 6 and FIG. 7 are respectively schematic top views of scintillator layers according to a plurality of embodiments of the disclosure. Referring to FIG. 6, four corners of a scintillator layer 11 may be fillet angles R. In detail, the scintillator layer 11 may include a base layer 110 and a scintillator material layer 112. In some embodiments, an area of the scintillator material layer 112 may be smaller than an area of the base layer 110 (as shown in FIG. 6), and four corners of the base layer 110 may be fillet angles R. In other embodiments, the area of the scintillator material layer 112 may be substantially equal to the area of the base layer 110 (not shown in the figures), and four corners of the scintillator material layer 112 and the base layer 110 may be fillet angles R. The base layer 110 is applicable to bearing the scintillator material layer 112. According to different requirements, the base layer 110 may be a hard substrate, a soft substrate, a curved substrate or a base layer in any other forms. In some embodiments, a material of the base layer 110 may include polyimide (PI), glass, polyethylene terephthalate (PET), polyethylene naphthalate (PEN) or other suitable materials, but the disclosure is not limited thereto.

The scintillator material layer 112 is disposed on the base layer 110. In some embodiments, the scintillator material layer 112 may be disposed between the base layer 110 and the first adhesion layer 12 (referring to FIG. 2). In some embodiments, a material of the scintillator material layer 112 may include cesium iodide (CsI), but the disclosure is not limited thereto. In other embodiments, a material of the scintillator material layer 112 may include an inorganic scintillator or organic scintillator in other kinds. In some embodiments, the scintillator material layer 112 may be formed on the base layer 110 through a deposition manufacturing process. The deposition manufacturing process may include an evaporation manufacturing process, but the disclosure is not limited thereto.

Referring to FIG. 7, in another embodiment, four corners of the scintillator layer 11 may be oblique angles RA. In detail, if the area of the scintillator material layer 112 is smaller than the area of the base layer 110 (as shown in FIG. 7), the four corners of the base layer 110 may be oblique angles RA. If the area of the scintillator material layer 112 substantially equals to the area of the base layer 110 (not shown in the figures), the four corners of the scintillator material layer 112 and the base layer 110 may be oblique angles RA.

Due to a design of fillet angles R or oblique angles RA, the difficulty of a film sealing manufacturing process may be reduced, or bubbles generated in the film sealing manufacturing process are reduced, so as to improve the edge fit or airtightness. However, in some other embodiments, four corners of the scintillator layer 11 may also be right angles or notches in irregular shapes. It is worth noting that the scintillator layer 11 is not necessarily to only have the single type of fillet angles R, oblique angles RA or notches in irregular shapes, and may be a combination of the fillet angle R, the oblique angle RA and the notch (or more).

Figure 8:
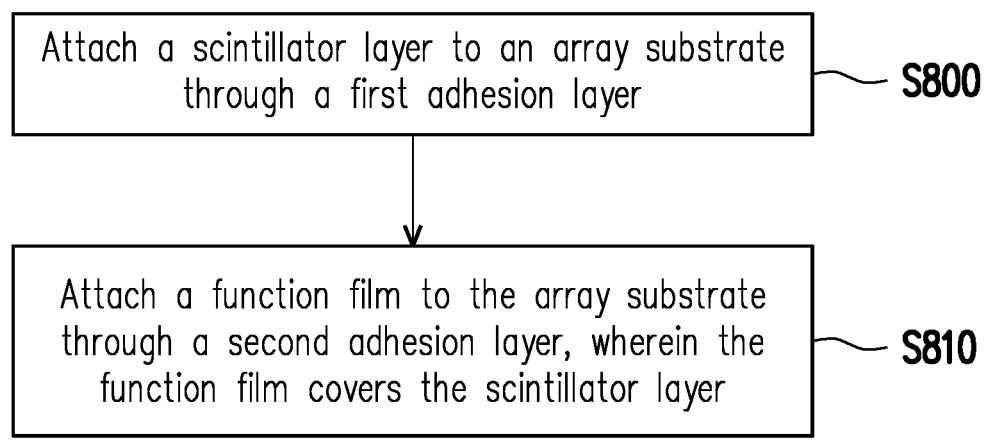
FIG. 8 is a flow diagram of a manufacturing method of an X ray device according to an embodiment of the disclosure.

FIG. 8 is a flow diagram of a manufacturing method of an X ray device according to an embodiment of the disclosure. Referring to FIG. 2 and FIG. 8 together, the manufacturing method of the X ray device may include the following steps of attaching the scintillator layer 11 to the array substrate 10 through the first adhesion layer (step S800); and attaching the function film 13 to the array substrate 10 through the second adhesion layer 14. The function film 13 covers the scintillator layer 11. In some embodiments, as shown in FIG. 5, a manufacturing method of the X ray device may further include: disposing the sealing layer 15 onto the function film 13 and the array substrate 10.

Based on the above, in embodiments of the disclosure, the scintillator layer is sealed on the array substrate through the function film and the second adhesion layer, and the invasion probability of external moisture into the scintillator layer may be effectively reduced. In some embodiments, four corners of the scintillator layer may be fillet angles or oblique angles, so as to reduce the difficulty of the film sealing manufacturing process or reduce the bubbles generated in the film sealing manufacturing process, thus improving the edge fit or airtightness. In some embodiments, the width of the bottom of the function film in the extending direction may be greater than or equal to 0.2 mm, so as to improve the waterproof capability of the side. In some embodiments, the second adhesion layer may be further disposed between the function film and the scintillator layer, so as to improve adhesion force between the function film and the scintillator layer. In some embodiments, the X ray device may further include a sealing layer, so as to further improve the waterproof capability of the side.

The foregoing embodiments are merely used for describing the technical solutions of the disclosure, but are not intended to limit the disclosure. Although the disclosure is described in detail with reference to the foregoing embodiments, a person of ordinary skill in the art should understand that, modifications may still be made to the technical solutions in the foregoing embodiments, or equivalent replacements may be made to some or all of the technical features; and such modifications or replacements will not cause the essence of corresponding technical solutions to depart from the scope of the technical solutions in the embodiments of the disclosure.

Although the embodiments and advantages of this disclosure have been disclosed above, it should be understood that, a person of ordinary skill in the art may make variations, replacements and modifications without departing from the spirit and scope of this disclosure, and the features of the embodiments may be in any combination and replaced with each other to form other new embodiments. In addition, the protection scope of this disclosure is not limited to a process, machine, manufacturing, material composition, device, method, and step in a specific embodiment in this specification. A person of ordinary skill in the art may understand the existing or to-be-developed process, machine, manufacturing, material composition, device, method, and step from the content of this disclosure, which may be used according to this disclosure as long as the substantially same function can be implemented or the substantially same result can be obtained in the embodiments described herein. Therefore, the protection scope of this disclosure includes the foregoing process, machine, manufacturing, material composition, device, method, and step. In addition, each claim forms an independent embodiment, and the protection scope of this disclosure also includes a combination of claims and embodiments. The protection scope of this disclosure should be subject to the appended claims.

What is claimed is:

1. An X ray device, comprising:
an array substrate;
a scintillator layer, disposed on the array substrate;
a function film, disposed on the array substrate; and
an adhesion layer, disposed between the function film and the array substrate,
wherein the function film covers the scintillator layer, and
wherein the function film, the adhesion layer, and the array substrate form an airtight space, and the scintillator layer is located in the airtight space.

2. The X ray device according to claim 1, wherein the function film comprises a reflecting layer for reflecting visible light.

3. The X ray device according to claim 1, wherein the function film comprises a waterproof layer.

4. The X ray device according to claim 1, wherein a material of the function film comprises metal.

5. The X ray device according to claim 1, wherein the airtight space is in a vacuum state.

6. The X ray device according to claim 1, wherein the adhesion layer is also disposed between the function film and the scintillator layer.

7. The X ray device according to claim 1, wherein four corners of the scintillator layer are oblique angles.

8. The X ray device according to claim 1, wherein four corners of the scintillator layer are fillet angles.

9. The X ray device according to claim 1, further comprising:
a sealing layer, disposed on the function film and the array substrate.

10. The X ray device according to claim 1, wherein the function film comprises:
a top; and
a bottom, wherein a width of the bottom in an extending direction is greater than or equal to 0.2 mm.

11. A manufacturing method of the X ray device, comprising:
disposing a scintillator layer on an array substrate; and
attaching a function film to the array substrate through an adhesion layer,
wherein the function film covers the scintillator layer, and
wherein the function film, the adhesion layer, and the array substrate form an airtight space, and the scintillator layer is located in the airtight space.

12. The manufacturing method of the X ray device according to claim 11, further comprising:
disposing a sealing layer onto the function film and the array substrate.

* * * * *